United States Patent
Tamagawa et al.

(10) Patent No.: US 6,414,453 B1
(45) Date of Patent: Jul. 2, 2002

(54) CONTROL APPARATUS FOR HYBRID VEHICLE

(75) Inventors: Yutaka Tamagawa; Shigeru Aoki; Kazuhiro Ueda, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 65 days.

(21) Appl. No.: 09/655,280

(22) Filed: Sep. 5, 2000

(30) Foreign Application Priority Data

Sep. 7, 1999 (JP) .......................................... 11-253654

(51) Int. Cl.$^7$ .............................. H02P 1/00; H02P 3/00; H02P 5/00
(52) U.S. Cl. ...................... 318/139; 318/376; 180/165; 320/166; 320/1
(58) Field of Search ................................ 318/139, 459, 318/375–378; 180/165, 65.1–65.8; 701/22; 320/166, 2, 5, 61, 11, 1

(56) References Cited

U.S. PATENT DOCUMENTS

| | | | | |
|---|---|---|---|---|
| 5,984,033 A | * | 11/1999 | Tamagawa et al. | 180/65.2 |
| 6,013,992 A | * | 1/2000 | Ishikawa et al. | 180/65.2 |
| 6,124,690 A | * | 9/2000 | Yano et al. | 180/65.2 |
| 6,138,784 A | * | 10/2000 | Oshima et al. | 123/568.11 |
| 6,140,780 A | * | 10/2000 | Oshima et al. | 180/65.2 |
| 6,186,255 B1 | * | 2/2001 | Shimasaki et al. | 180/65.3 |
| 6,222,334 B1 | * | 4/2001 | Tamagawa et al. | 180/65.3 |
| 6,223,106 B1 | * | 4/2001 | Yano et al. | 180/165 |
| 6,296,593 B1 | * | 10/2001 | Gotou et al. | 477/176 |
| 6,330,498 B2 | * | 12/2001 | Tamagawa et al. | 180/65.2 |

FOREIGN PATENT DOCUMENTS

| | | | |
|---|---|---|---|
| JP | 10-23603 | 1/1998 | |
| JP | 10309002 A | * 11/1998 | ........... B60L/11/14 |
| JP | 11-220810 | 8/1999 | |

* cited by examiner

*Primary Examiner*—Jeffrey Donels
*Assistant Examiner*—Edgardo San Martin
(74) *Attorney, Agent, or Firm*—Armstrong, Westerman & Hattori, LLP

(57) ABSTRACT

A control apparatus for a hybrid car is provided, capable of reliably protecting an electric double layer capacitor from being subjected to an excess voltage. A hybrid car comprises an engine E, a clutch 10, driving wheels W, a motor 19, an electric double layer capacitor 21 for supplying electric power to the motor and for storing the electric power generated by the motor, a switching device 23 for connecting or disconnecting the electric double layer capacitor and the motor, and a voltage detecting device 22 for detecting the terminal voltage of the electric double layer capacitor, and a control device 20 for controlling the switching device in response to the terminal voltage detected by said voltage detecting device, wherein when the terminal voltage of the electric double layer capacitor exceeds a standard value, while the motor is actuated as a brake, the control device is constituted such that the connection between the electric double layer capacitor and the motor is disconnected and the clutch is connected.

2 Claims, 4 Drawing Sheets

CONTROL APPARATUS FOR HYBRID VEHICLE

BACKGROUND OF THE INVENTION

1. Field of the Invention

The present invention relates to a parallel-type hybrid car and particularly relates to a control apparatus for a hybrid car, which uses an electric double layer capacitor and which can provide a braking force for the car by charging the electric double layer capacitor by regeneration by the motor.

2. Background Art

Electric cars are currently under development in order to reduce the discharge of exhaust gas into the atmosphere. However, the cruising range of electric cars driven only by a motor is limited by the capacity of the battery which stores the electric energy. If sufficient cruising distance is desired, very large batteries are required, which seriously degrades the travelling performance of the car.

Hence, hybrid cars have becomes the subject of intensive development, because it is possible for hybrid cars to provide a large cruising range and good driving performance by using both an engine driven by the combustion of fossil fuel and a motor activated by a comparatively small battery.

Parallel-type hybrid cars, one type of hybrid car, realize good driving performance, reduced emission of exhaust gas, and reduced fuel consumption by switching the driving modes from engine drive mode to motor drive mode according to the driving conditions.

That is, hybrid cars travel using the engine only, when travelling using the engine is efficient, and the motor assists the engine or the motor drives the car without the engine when the travelling conditions are not conductive to efficient using the engine, such as when accelerating or when travelling slowly.

In addition, when braking the car, the motor is operated as a generator for recovering the kinetic energy of the car, and energy loss can be prevented and the fuel consumption can be reduced.

That is, when braking the car, the motor is rotated by the kinetic energy of the car, and the electric power generated by rotation of the motor is charged into the battery, so that the energy made available by braking can be recovered.

However, when the charging of the battery continues and the amount of charge exceeds the maximum charge limit of the battery and causes overcharging, the battery may be degraded.

In order prevent such overcharging of the battery, charging should be terminated when the battery is in the fully charged state. However, when regenerative braking is terminated as the car is braking, the braking force is lost, which not only reduces the feeling of drivability, but also imposes a burden on the brake mechanism, for example, on a long downhill stretch, because frequent braking operations are required.

In order to avoid such problems, a technique is disclosed in, for example, Japanese Unexamined Patent Application, First Publication No. Hei 10-23603, in which a braking force is obtained by use of engine braking by connecting the engine and the drive wheels, and regenerative charging is not allowed when it is detected that the state of charge of the battery exceeds 100% of the battery capacity.

In contrast, the use of an electric double layer capacitor in place of a battery has also been considered. This is because electric double layer capacitors have the advantage that they can output a large amount of energy per unit time, that is, electric double layer capacitors have a high energy output density. The high energy out density can respond to a high electric demand such as a high peak electric power at the time of rapid acceleration.

However, when an electric double layer capacitor is used instead of a battery, the following problem arises. That is, there is the possibility that the performance of the electric double layer capacitor will be degraded when a high voltage, which is higher than the withstand voltage of the electric double layer capacitor, is applied between both terminals of the capacitor. Accordingly, it is necessary to restrict the voltage applied between both terminals of the electric double layer capacitor.

However, when the regenerative charging is controlled based on the state of charge of the capacitor, a problem arises in the case of the electric double layer capacitor. This is because the state of charge and the terminal voltage between both terminals of the electric double layer capacitor are not directly related.

Since the internal resistance of the electric double layer capacitor is larger than that of a battery and since a voltage is generated due to the internal resistance when a current flows into the electric double layer capacitor due to regenerative charging, a higher voltage than the voltage determined by the state of charge is applied between both terminals of the capacitor.

Therefore, degradation of the performance or degradation of the insulation of the electric double layer capacitor can not be prevented using the voltage value obtained by the state of charge.

SUMMARY OF THE INVENTION

The present invention has been made to solve above problems. It is an objective of the present invention to provide a control apparatus for hybrid cars, capable of avoiding degradation of the insulation or the performance of an electric double layer capacitor.

According to the first aspect of the present invention, a control apparatus is provided in a hybrid car comprising: an engine for outputting a driving force of a car; a clutch connected with an output shaft of said engine including a pair of engaging elements (the engaging elements 11 and 12 in the present embodiment) for connecting or disconnecting the input side and the output side of the shaft for transmitting the driving power; driving wheels (the driving wheels W in the present embodiment) connected to the output of the clutch; a motor (the main motor 19 in the present embodiment) connected to the driving wheels for outputting the driving force of the car and can also be actuated as a regenerative brake; an electric double layer capacitor (the electric double layer capacitor 21 in the present embodiment) for supplying electric power to said motor when the motor outputs the driving power, and for storing the electric power generated by said motor when said motor is actuated as a regenerative brake; a switching device (the power drive unit 23 in the present embodiment) for connecting or disconnecting said electric double layer capacitor and said motor; a voltage detecting device for detecting a terminal voltage (the terminal voltage Vtotal in the present embodiment) of said electric double layer capacitor; and a control device (the control circuit 20 in the present embodiment) for controlling said clutch and said switching device in response to the terminal voltage detected by said voltage detecting device; wherein, during the time that the motor is actuated as a regenerative brake, when the terminal voltage detected by said voltage detecting device exceeds a predetermined standard value, said control device disconnects the connection between the electric double layer capacitor and the motor by said switching device and connects said pair of engaging elements included in said clutch.

According to the above embodiment, the terminal voltage of the electric double layer capacity is detected by the voltage detecting device, the thus detected voltage is compared with the standard value corresponding to the withstand voltage of the electric double layer capacitor, and if the detected voltage exceeds the standard value, the connection between the electric double layer capacitor and the motor is disconnected by the switching device, so that the electric double layer capacitor is protected from being subjected to a voltage higher than the withstand voltage of the electric double layer capacitor.

According to the second aspect of the present invention, a control apparatus of a hybrid car is provided according to the first aspect, wherein said voltage detecting device detects terminal voltages (terminal voltages V1, V2, . . . , Vn in the present embodiment) of respective individual cells (cells 211, 212, . . . , 21n in the present embodiment) included in said electric double layer capacitor.

According to the above structure, the voltage detecting devices detects the terminal voltages of individual cells and charging of the electric double layer capacitor is controlled based on these detected voltages, so that the individual cells included in the electric double layer capacitor are protected from being subjected to a voltage higher than the withstand voltage of each cell.

DETAILED DESCRIPTION OF THE INVENTION

Figure 1:
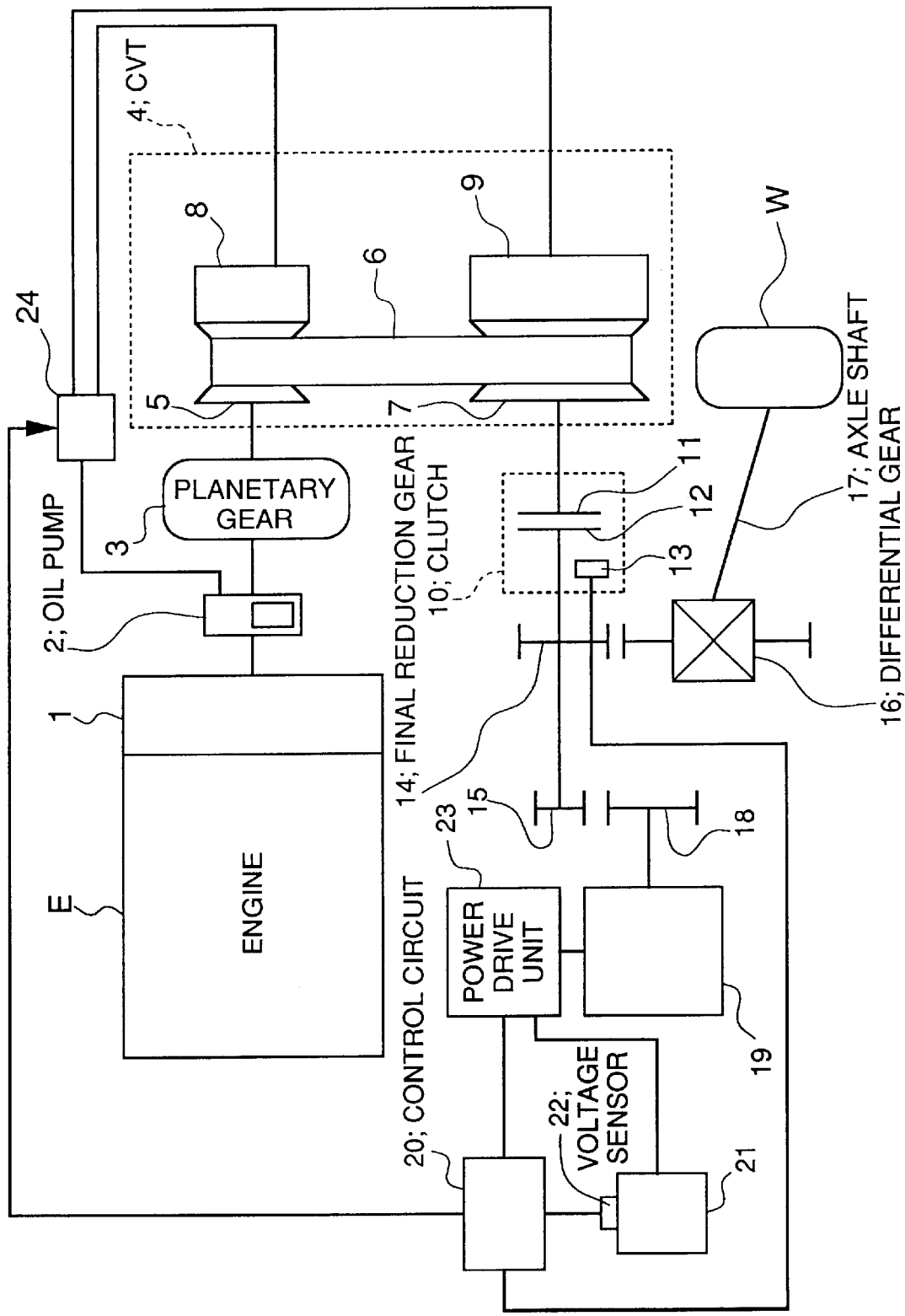
FIG. 1 is a schematic diagram showing a power transmission system and a control system of a hybrid car according to one embodiment of the present invention.

A structure of a hybrid car according to one embodiment of the present invention is described with reference to FIG. 1. FIG. 1 is a schematic diagram showing a power transmission system and a control system of the hybrid car according to this embodiment of the present invention.

First, the power transmission system is described. An output shaft of the engine E is connected to an oil pump 2 through a sub-motor 1. The sub-motor 1 actuates or assists the engine E. The oil pump 2 generates oil pressure by the driving force of the engine E for controlling the transmission of the CVT (Continuous Variable Transmission) 4.

Furthermore, the output shaft of the engine E is connected to a planetary gear 3 for switching between forward or reverse driving of the car. This planetary gear 3 is connected mechanically to a select bar (not shown in the figure) and switching between forward or reverse driving can be carried out by an operation of the select bar.

The output shaft of the planetary gear 3 is connected to a driving side pulley 5 included in the CVT 4 for operating the variable transmission. The CVT 4 includes a metal belt 6, a driven side pulley 7, and side chambers 8 and 9, in addition to the pulley 5. The driving side pulley 5 and the driven side pulley 7 are connected by a common metal belt 6, and power can be transmitted between both pulleys.

There are provided side rolls 8 and 9 on respective sides of those pulleys 5 and 7 for changing the respective winding radii of the metal belt 6 around both pulleys 5 and 7. The winding radii of the metal belt around the respective pulleys are changed by changing the width of both pulleys by applying oil pressure to both side chambers 8 and 9 and by changing the contact points between the metal belt and the inclined surfaces of the pulleys. The oil pressure applied to the side chambers 8 and 9 is generated by the oil pump 2.

The driven pulley 7 included in the CVT 4 is connected to an engaging element 11 included in the clutch 10. The clutch 10 includes, in addition to the engaging element 11, an engaging element 12, forming a pair of the engaging element 11, and a clutch controlling actuator 13 which connects or separates these engaging elements 11 and 12.

The engaging element 12 included in the clutch 10 is connected to a final reduction gear 14 and a gear 15. The final reduction gear 14 engages with a differential gear 16. The differential gear 16 is connected to a driving wheel W of a car through an axle shaft 17.

The above described gear 15 is engaged with a gear 18, which is connected to a rotation axis of a main motor 19.

Next, the control system is described. The control circuit 20 comprises a voltage sensor 22 provided on the electric double layer capacitor 21, which constitutes a power source of the main motor 19; a power drive unit 23 for controlling the above described main motor 19; a clutch controlling actuator 13 included in the clutch 10; and an oil pressure control device 24 for controlling the oil pressure applied to the side chambers 8 and 9 included in the CVT 4.

The electric double layer capacitor 21 is connected to the main motor 19 through the power drive unit 23. A voltage sensor 22 is provided between both terminals of the electric double layer capacitor 21.

Figure 2:
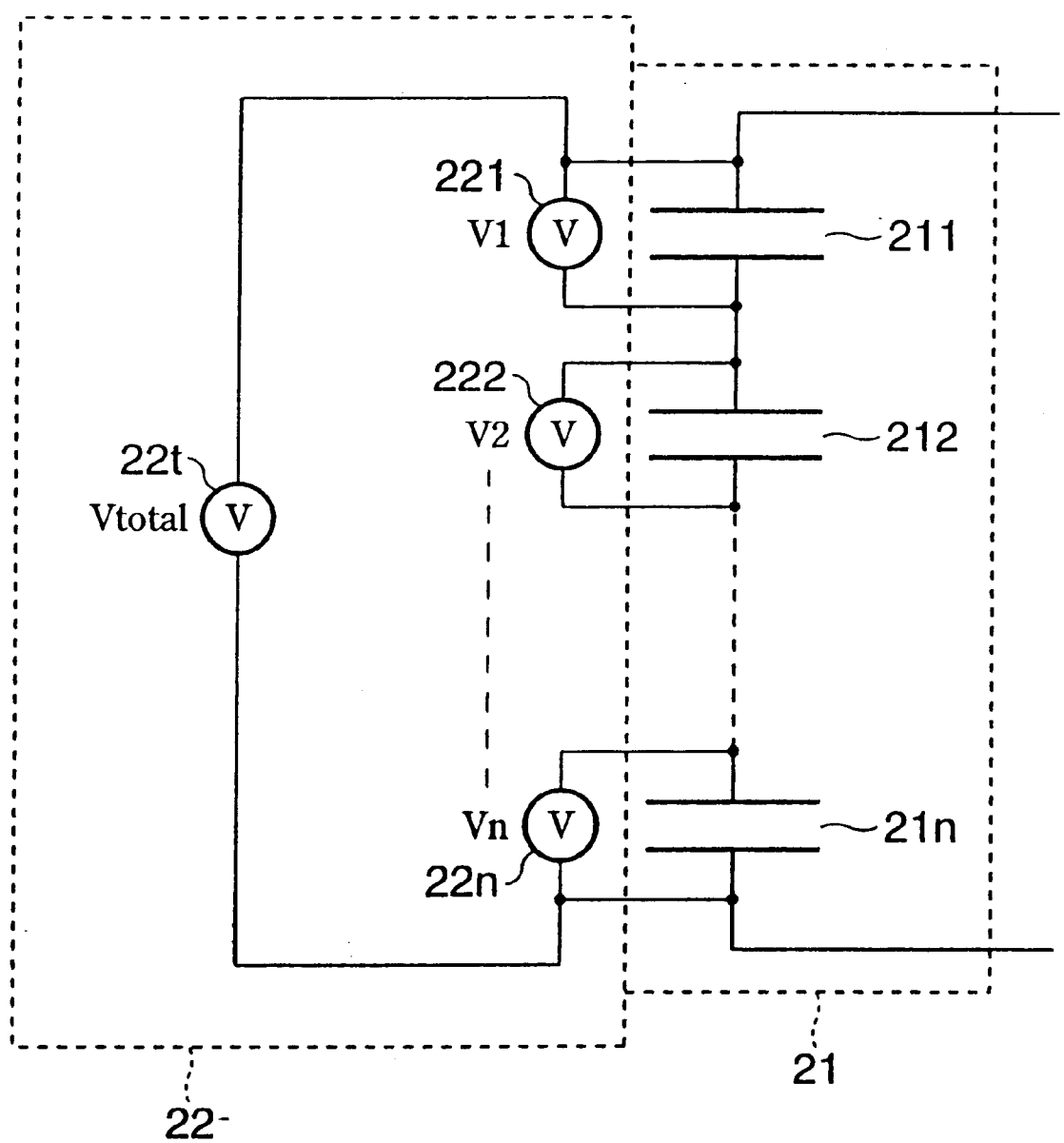
FIG. 2 is a diagram showing the detailed structures of an electric double layer capacitor 21 and a voltage sensor 22.

FIG. 2 is a diagram showing the detailed structure of an electric double layer capacitor 21 and a voltage sensor 22. The electric double layer capacitor 21 has a structure in which a plurality of cells 211, 212, 213, . . . , 21n are laminated. The voltage sensor 22 includes a voltage sensor 22t for detecting the terminal voltage of the electric double layer capacitor as a whole, and voltage sensors 221, 222, 223, . . . , 22n for detecting terminal voltages V1, V2, V3, . . . , for respective cells 211, 212, 213, . . . , 21n.

Next, the operation of the present embodiment is described with reference to FIG. 1. The operation of the control system will be first described. An explanation is provided for travel by the driving force of the engine E. The driving force of the engine E drives the oil pump 2 and the planetary gear 3 through the sub-motor 1. The oil pump 2 generates an oil pressure and transmits this oil pressure to the side chambers 8 and 9 included in the CVT 4 through the oil pressure control apparatus 24. The planetary gear 3 switches the rotating direction of the shaft by operating the select bar (not shown) for switching forward or reverse driving.

The rotation of the output shaft of the planetary gear 3 is transmitted to the driving side pulley 5 included in the CVT 4, and the rotation of the driving side pulley is transmitted to the driven side pulley 7 through the metal belt 6. The ratio of the number of rotations of the driving pulley 5 to that of the driven pulley is determined by the winding radii of the metal belt 6 around the pulleys 5 and 7. The winding radii of the metal belt 6 around the pulleys 5 and 7 can be changed by changing the width of both pulleys by applying oil pressure to both side chambers 8 and 9 and by changing the contact points of the metal belt with inclined surface of the pulleys 5 and 7. The pressing forces by the side chambers 8 and 9 are generated by the oil pressure of the oil pump 2, and the thus obtained oil pressure is controlled by the oil pressure control apparatus 24 disposed between the oil pump 2 and the side chambers 8 and 9.

The driven pulley 7 included in the CVT 4 transmits the rotation to the engaging element 11 included in the clutch 10. The engaging elements 11 and 12 are connected or separated by the actuator 13 for controlling the clutch 10, and the rotation can be transmitted when both elements 11 and 12 are connected and cannot be transmitted when separated.

When the engaging elements 11 and 12 are connected, the rotation of the engaging element 11 is transmitted to the engaging element 12, and the rotation of this engaging element 12 is transmitted to the final reduction gear 14 and the gear 15.

The rotation of the gear 15 is transmitted to a gear 18 which is engaged with the gear 15, and the rotational shaft of the main motor 19 is rotated by the rotation of the gear 18.

At this time, the rotation of the main motor 19 generates the electric power. When the driving conditions are such that the mode is set to charge the electric double layer capacitor 21 for use as the power source of the motor, electric power is generated by the rotation of the main motor 19, and the generated electric power is charged in the electric double layer capacitor 21 through the power drive unit 23.

In contrast, when the driving conditions are not such that the mode is set to charge the electric double layer capacitor 21, although the rotating shaft is rotated, electric power is not derived and the motor is running in idle.

The rotation of the final reduction gear 14 is transmitted to the driving wheels W of the car through the differential gear 16 and the axle shaft 17. The diving wheels W are driven by the above described operation, and the car travels.

Next, an operation will be described in the case of driving the car by the main motor 19. The electric double layer capacitor 21 supplies electric power to the main motor through the power drive unit 23. The main motor 19 generates a driving force from its rotating shaft by the thus supplied electric power. The rotation of the gear 18 is transmitted to the gear 15 which engages with the gear 15 and the rotation of the gear 15 is transmitted to the final reduction gear 14 which is connected with the gear 15 through the shaft.

When the car travels by the driving force of the main motor 19, that is, when the car is in a motor drive mode, the clutch 10 is in the off state. That is, both engaging elements 11 and 12 included in the clutch 10 are separated and the rotation i not transmitted across the engaging elements. Thus, the final reduction gear 14 is disconnected at the clutch 10 and its rotation is not s transmitted to the CTV 4.

Therefore, the rotation of the final reduction gear 14 is only transmitted to the differential gear 16, and the rotation of the differential gear 16 is transmitted to the driving wheel W through the axle shaft 17. The driving wheel W is driven by the above described operation, and the car travels.

Next, an operation in which a braking force is obtained by use of the engine as a load, that is, an operation in the case of actuating an engine brake, is described. The rotation is transmitted in this case by carrying out the reverse of the process for the above described transmission process for travel of the car by rotating the axle shaft by the engine E. That is, the rotation of the driving wheel is transmitted to the clutch through the axle shaft 17, the differential gear 16, and the final reduction gear 16.

Here, when actuating the engine brake, the clutch 10 is first connected. That is, a clutch control actuator 13 included in the clutch 10 is actuated for connecting the engaging elements 12 and 11. Then, the rotation transmitted from the final reduction gear 14 is transmitted to the driven side pulley 18, included in the CVT 4 through the clutch 10.

The rotation of the driven side pulley 7 is transmitted to the driving side pulley 5 by the metal belt 6 and the driving side pulley 5 is transmitted to the planetary gear 3. The rotation of the planetary gear 3 is then transmitted to the engine 8, through the oil pump 2, and the submotor 1. The braking force is generated by the load inside of the engine E and the engine brake is actuated.

Next, an operation for obtaining the braking force by use of the motor as a load, that is, an operation for regenerative braking is described. In this case, the rotation is transmitted by the reverse of the transmission process of travel of the car by rotating the driving wheel W by the main motor 19. That is, the rotation of the driving wheel W is transmitted to the gear 15 through the axle shaft 17, the differential gear 16, and the final reduction gear 14.

When the regenerative braking by the motor is carried out, the clutch 10 is first disconnected and the rotation of the final reduction gear 14 is transmitted entirely to the gear 15. The rotation of the gear 15 is transmitted to the gear 18, and the rotational shaft of the main motor is rotated by the rotation of the gear 18.

The main motor 19 operates as a power generator by rotation of the rotational shaft of the main motor 19 by an external force. When the regenerative braking by the motor is carried out, the power drive unit 23 connects the main motor 19 and the electric double layer capacitor 21. Accordingly, the electric power generated by the main motor 19 is sent to the electric double layer capacitor 21 through the power drive unit 23 and is stored therein. As described above, generation of the electric power by the main motor 19 generates a load in the main motor 19, which results in producing a braking force for regenerative braking by the motor.

Next, the operation of the control circuit is described. The control circuit 20 controls the oil control unit 24 for controlling the oil pressure to be applied to the side chambers 8 and 9 included in the CTV 4. The control of the oil pressure allows changing the widths of the driving side pulley 5 and the driven side pulley 7, and the change of the widths of both pulleys leads to a change in the contact points of the metal belts 6 with both pulleys 5 and 7, which results in a speed change of the car.

The control circuit 20 also controls the clutch control actuator 13 included in the clutch 10 for carrying out the connection or disconnection of the clutch 10. That is, the clutch control actuator 13 controls connection and disconnection of the engaging elements 11 and 12 included in the clutch 10.

Furthermore, the control circuit 20 controls the power drive unit 23 for connecting or disconnecting the connection between the main motor 19 and the electric double layer capacitor 21. That is, the power drive unit 23 connects the main motor 19 and the electric double layer capacitor 21, when supplying the electric power from the electric double capacitor 21 to the main motor 19 for travel of the car, or when the electric power generated by the main motor 19 is charged into the electric double layer capacitor 21. The connection between the electric double layer capacitor 21 and the motor 19 is disconnected when the car is driven only by the engine or when the braking operation is carried out only by the engine braking.

The control circuit 20 inputs the output of the voltage sensor 22 connected between the terminals of the electric double layer capacitor 21. That is, the control circuit 20 inputs measurement voltages detected by the voltage sensor 22 between terminals of the electric double layer capacitor 21.

At the time of regenerative braking by the motor, when the charging of the electric double layer capacitor 21 continues, and when the terminal voltage of the electric double layer capacitor 21 exceeds the withstand voltage of the capacitor, the control circuit 20 controls the power drive unit 23 for disconnecting the connection between the main motor 19 and the electric double layer capacitor 21.

Thereby, the charging of the electric double layer capacitor 21 is terminated, and the terminal voltage of the electric double layer capacitor 21 is not readed. However, it is noted that, since the electric power cannot be derived from the main motor 19, the load of the main motor 19 is lost, so that the braking force of the car is lost.

At this time, simultaneously, the control circuit 20 controls the clutch control actuator 13 included in the clutch 10 to connect the clutch 10. The rotating force transmitted from the driving wheel W to the final reduction gear 14 through the axle shaft 17 and the differential gear 16 is transmitted to the CVT 4 through the clutch 10 and further transmitted to the engine E through the planetary gear 3, the oil pump 2 and the sub-motor 1. Thereby, a braking force by the load of the engine E is generated, and the engine brake is actuated, which compensates for the lost regenerative braking power of the car.

Figure 3:
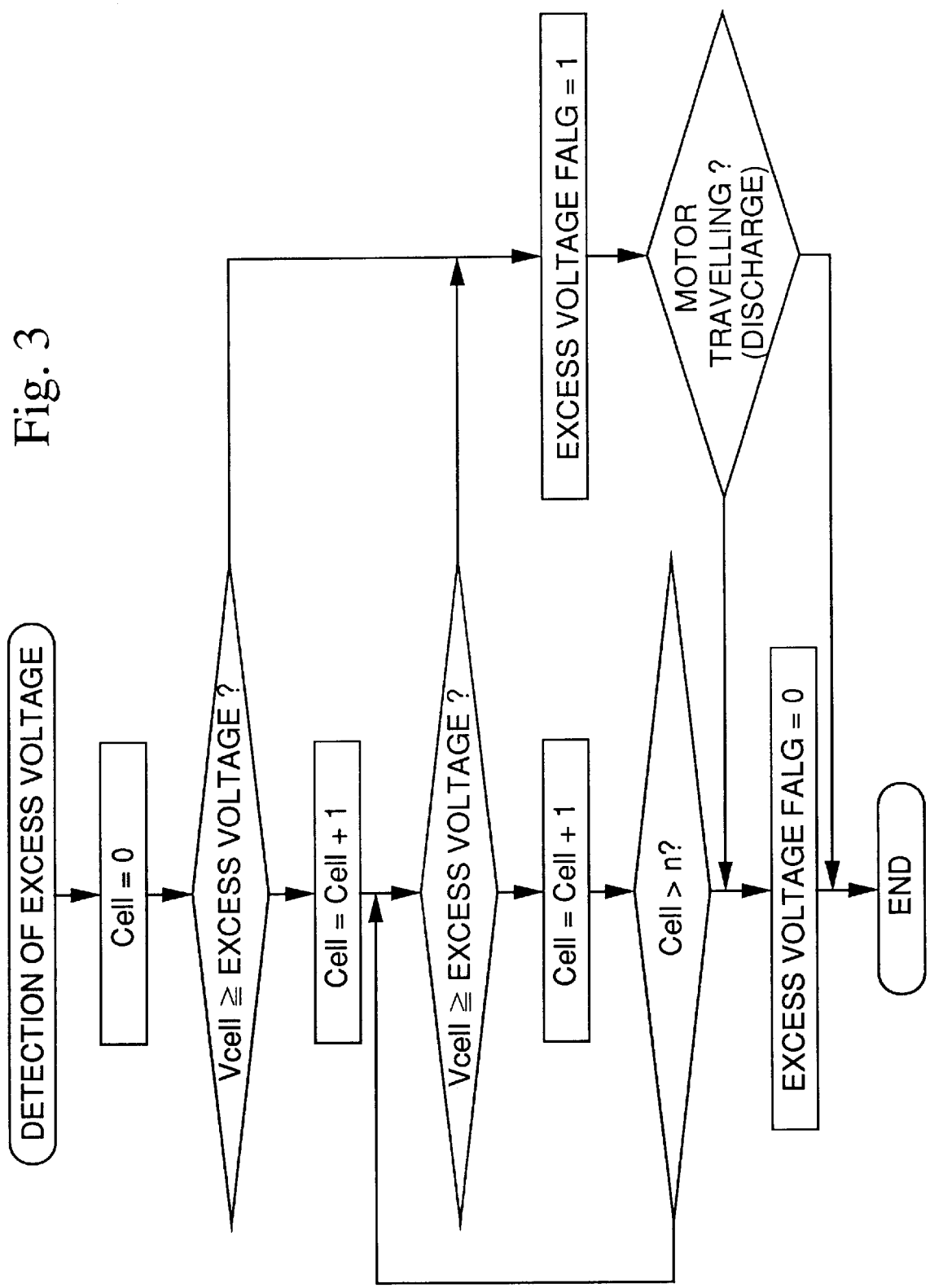
FIG. 3 is a flow-chart showing the flow for operating an over-voltage flag based on a terminal voltage of the electric double layer capacitor 21.

The operation of detecting the terminal voltage of the electric double layer capacity is described hereinafter in detail with reference to FIG. 3, which is a flow chart for the steps of detecting the excess voltage. FIG. 3 is a flow-chart showing a flow for operating an excess voltage flag based on a voltage between both terminals of the electric double layer capacitor 21. The symbols such as S1 and so on mentioned in the following show the steps in the flow-chart shown in FIG. 3.

The variable "Cell" in the control circuit 20 is set to "0" (S1). The value of the variable "Cell" corresponds to the cells included in the electric double layer capacitor 21. For example, when "Cell"=1, the cell 211 has been selected for detecting the terminal voltage, and when "Cell"=0, the entire electric double layer capacitor 21 is selected as an object for measurement of the terminal voltage.

Next, a measurement is made to detect the terminal voltage of the electric double layer by means of the voltage sensor 22. That is, since the entire electric double layer capacitor 21 is selected as the object for measurement by setting to Cell=0, the terminal voltage of the entire electric double layer capacitor 21 Vtotal is measured by the voltage sensor 2t included in the voltage sensor 22.

The measured value Vtotal obtained by the voltage sensor 22t is transmitted to the control circuit 20, and a comparison is made between the measured value and a standard value stored in the control circuit 20 in advance (S2). The standard value in this case corresponds to the withstand voltage of the entire electric double layer capacitor 21. If the result of the comparison satisfies the relationship that the measured value≧the standard value, then the flow jumps to S8, and if the results of the comparison does not satisfy the above relationship, then the flow goes to the next step S3.

In step S3, the variable "Cell" is incremented by 1. That is, in step S1, since "Cell"=0 in step S1, when 1 is added to the variable, "Cell" becomes 1, that is Cell=1, which means that the cell 211 is selected for the measurement.

Next, a loop S4 to S6 is started for measuring respective cells 211 to 21n included in the electric double layer capacitor 21. Since Cell=1 is set in step S3, the terminal voltage of the cell 211 is measured by the voltage sensor 221. The measured value is transmitted to the control circuit 20 and a comparison is made with a standard voltage (S4). The standard value of this case corresponds to the withstand voltage of the cell 211. If the result of the comparison satisfies the relationship that the measured value≧the standard value, then the flow jumps to S8, and if the results of the comparison do not satisfy the above relationship, then the flow goes to the next step S5.

In step S5, the variable "Cell" is incremented by 1. As a result, the variable "Cell" is increased to 2.

In the next step S6, the value of the variable "Cell" is compared with the total number of cells in the electric double layer capacitor n. If Cell>n, the flow goes to S7, if not, the flow goes back to S4, and repeats the loop S4 to S6. At present, the value of the variable "Cell" is 2, which is lower than the total number of the cells, so that the flow goes back to S4.

In the step S4, in this case Cell=2, the terminal voltage V2 of the cell 212 is measured by the voltage sensor 222, and the measured value is transmitted to the control circuit 20 being comparison with the standard value. The standard value in this case is the withstand voltage of the cell 212. When the result of the comparison is the measured value≧the standard value, the flow goes jumps to the step S8, and if not, the flow goes to the step S5.

In the step S5, the variable "Cell" is incremented by 1. The variable "Cell" becomes 3.

In the next step, the variable "Cell" is compared with the total number of cells, and if Cell>n, the flow goes to step S9, and if not, the flow returns to step S4 for repeating the loop S4 to S6.

In the operations described above, if the voltages between the terminals of each cell do not exceed the withstand voltage of each cell, the loop S4 to S6 is repeated and the loop is completed when the variable Cell becomes n+1, and the flow goes to the step S7.

Even though the withstand voltages for respective cells are varied, since respective standard values corresponding to respective cells are stored in the control circuit 20, it is possible to detect whether a voltage between the terminals of a cell exceeds the withstand voltage of the cell. When the terminal voltage exceeds the withstand voltage of the cell, the flow goes to the step S7 and the excess voltage flag described later is set to 1.

In the step S7, the excess voltage flag is set to 0. The state of the excess voltage flag is detected in the other flow described later and the excess voltage flag is used for controlling the charge etc.

When a voltage which exceeds the withstand voltage of a cell is detected in the steps S2 or S4, the flow jumps to the step S8 and the excess voltage flag is set to 1 in this step S8, and then the flow goes to the next step S9.

In the next step S9, it is detected whether the car is travelling by the motor, that is, whether the electric double layer capacitor is discharging. If the result shows that the capacitor is discharging, the flow goes to the step S7 to reset the excess voltage flag to 0. In contrast, if the result shows that it is not discharging, then the flow is completed while the excess voltage remains at 1.

Figure 4:
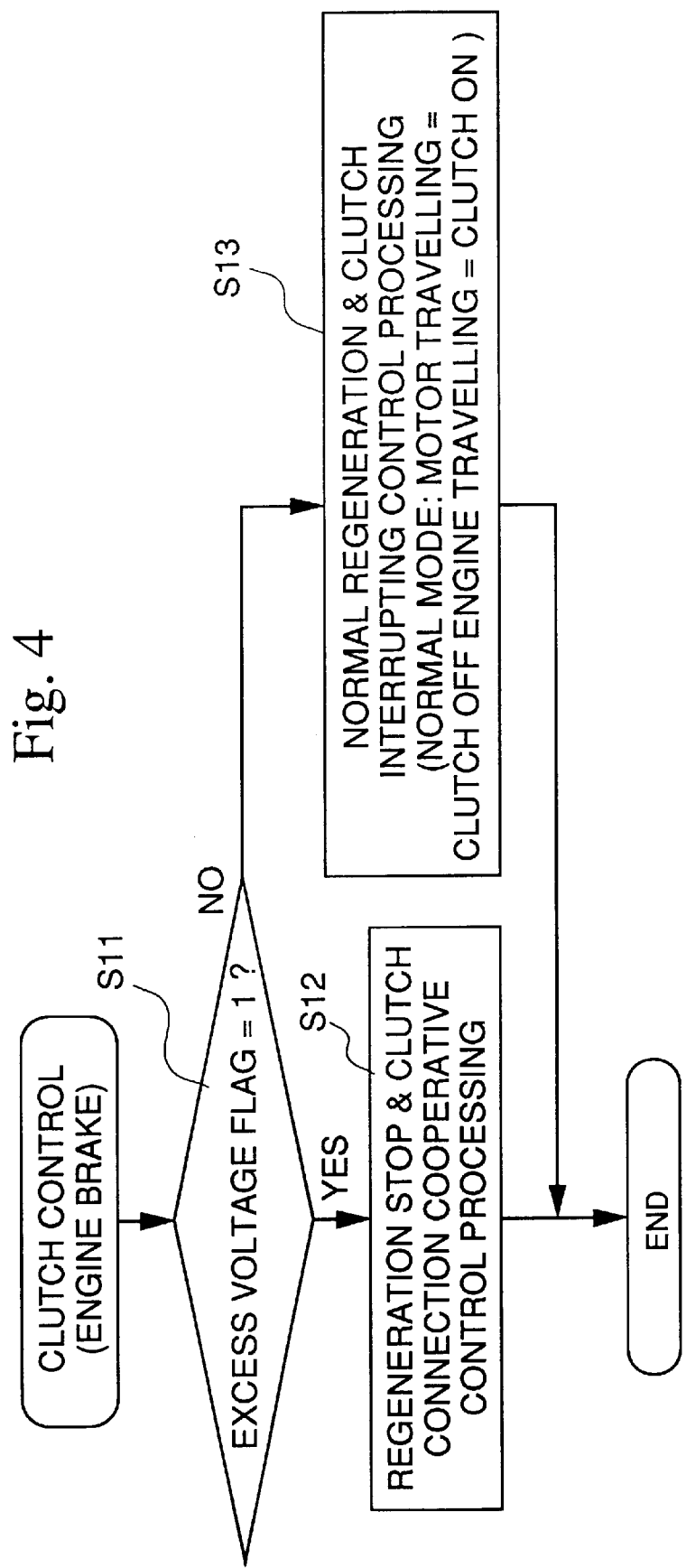
FIG. 4 is a flow-chart showing the flow for controlling the connection and disconnection of the regenerative charging and the clutch 10 to the electric double layer capacitor 21 based on the over-voltage flag.

Next, a flow for controlling the regeneration and the clutch operation based on the above excess voltage flag is described with reference to FIG. 4. The symbols such as S11 in the following description represent the steps in the flow.

First, the state of the excess voltage flag is examined (S11), and if the excess voltage flag is 1, then the flow goes to S12. If the excess voltage flag is 0, the flow goes to step S13.

When the excess voltage flag is 1, the flow goes to S12 and the regenerative charging is stopped, and the clutch is connected and the engine brake is actuated.

When the excess voltage flag is 0, the flow goes to the step S13, and the normal control continues. That is, if regenerative charging is in progress, this operation continues, and if further braking force is necessary, intermittent connection and disconnection is carried out. If the car is travelling by the motor, the travels proceeds while the clutch is disconnected. If the car is travelling by the engine, the travel proceeds while the clutch is connected.

As described above, when any one of the voltage Vtotal between terminals of the entire electric double layer capacitor 21 and the voltages V1, V2, . . . , Vn between terminals of respective cells 211, 212, . . . , 21n exceeds the standard voltage corresponding to the withstand voltage of the respective terminals, the regenerative charging of the electric double layer capacitor 21 is stopped and the capacitor is protected.

In the above described embodiment, the regenerative charging is stopped when the terminal voltage of the electric double layer capacitor 21 exceeds a standard voltage corresponding to the withstand voltage. However, it is noted that the terminal voltage of the electric double layer capacitor 21 can be set not to exceed the withstand voltage by setting a standard value which is lower than the withstand voltage of the electric double layer capacitor and by reducing the amount of regenerative charging by setting a lower standard voltage.

The present invention is designed such that, when the motor is actuated as a regenerative brake, if the terminal voltage of the electric double layer capacitor exceeds a predetermined standard value corresponding to the withstand voltage of the electric double layer capacitor, the control device disconnects the connection between the electric double layer capacitor and the motor by means of a switching device so that regenerative charging of the electric double layer capacitor is stopped.

Therefore, irrespective of the state of charge of the battery or the voltage generated by the charge current and the internal resistance of the electric double layer capacitor, when the terminal voltage of the electric double layer capacitor exceeds the withstand voltage, regenerative charging of the electric double layer capacitor is stopped and the electric double layer capacitor is reliably protected from being subjected to the excess voltage.

Furthermore, since the terminal voltage can be accurately detected, the electric double layer capacitor can be charged until the terminal voltage reaches the withstand voltage. Accordingly, it is possible to substantially increase the amount of energy which can be stored in the electric double layer capacitor. Since the electric double layer capacitor has a smaller energy storage volume than that of the battery, the above described effect is effective for a hybrid car.

Furthermore, since the clutch is connected at the same time that the regenerative charging of the electric double layer capacitor is stopped, the braking force lost by the stoppage of regenerative charging can be compensated for engine brake, so that the feel of good driving drivability feeling can be maintained.

The present invention provides a voltage detecting device, which detects the terminal voltages of each cell of the electric double layer capacitor, compares the detected values with standard values corresponding to the withstand voltages of the respective cells, and controls the regenerative charging of the electric double layer capacity, so that it is possible to protect every cell from being subjected to an excess voltage.

What is claimed is:

1. A control apparatus of a hybrid car comprising:

an engine for outputting a driving force of a car;

a clutch connected with an output shaft of said engine including a pair of engaging elements for connecting or disconnecting the input side and the output side of the shaft for transmitting the driving power;

a driving wheel connected to the output of the clutch;

a motor connected to the driving wheel for outputting the driving force of the car and which can be actuated as a regenerative brake;

an electric double layer capacitor for supplying an electric power to said motor when the motor outputs the driving power, and for storing by the electric power generated by said motor when said motor is actuated as a regenerative brake;

a switching device for connecting or disconnecting said electric double layer capacity and said motor;

a voltage detecting device for detecting a terminal voltage of said electric double layer capacitor; and a control device for controlling said clutch and said switching device in response to the terminal voltage detected by said voltage detecting device;

wherein, while the motor is actuated as the regenerative brake, when the terminal voltage detected by said voltage detecting device exceeds a predetermined standard value, said control device disconnects a connection between the electric double layer capacitor and the motor by said switching device and connects said pair of engaging elements included in said clutch.

2. A control apparatus of a hybrid car according to claim 1, wherein said voltage detecting device detects terminal voltages of respective individual cells included in said electric double layer capacitor.

\* \* \* \* \*